United States Patent [19]

Matsuo

[11] Patent Number: 5,430,837
[45] Date of Patent: Jul. 4, 1995

[54] MECHANISM CONCEPTUAL DRAWING FORMATION METOD AND APPARATUS

[75] Inventor: Eiji Matsuo, Nagaokakyo, Japan

[73] Assignee: Mitsubishi Denki Kabushiki Kaisha, Tokyo, Japan

[21] Appl. No.: 316,366

[22] Filed: Oct. 3, 1994

Related U.S. Application Data

[63] Continuation of Ser. No. 775,985, filed as PCT/JP91/00401, Mar. 27, 1991, abandoned.

[30] Foreign Application Priority Data

Mar. 27, 1990 [JP] Japan .................. 2-77595

[51] Int. Cl.6 .......................... G06F 15/46
[52] U.S. Cl. ................... 395/155; 395/161
[58] Field of Search ......... 395/155, 200, 161, 120; 364/146, 147, 149, 150, 151, 474.03, 474.05, 474.24, 474.26

[56] References Cited

U.S. PATENT DOCUMENTS

| | | | |
|---|---|---|---|
| 4,813,013 | 3/1989 | Dunn | 395/159 |
| 4,885,694 | 12/1989 | Pray et al. | 395/155 X |
| 4,901,221 | 2/1990 | Kodosky et al. | 364/200 X |
| 4,912,657 | 3/1990 | Saxton et al. | 395/155 X |
| 5,006,991 | 4/1991 | Ohcoshi et al. | 395/120 X |
| 5,019,961 | 5/1991 | Addesso et al. | 395/161 X |
| 5,119,309 | 6/1992 | Cavendish et al. | 395/120 X |
| 5,138,697 | 8/1992 | Yamamoto et al. | 395/120 |
| 5,163,006 | 11/1992 | Deziel | 395/161 X |

FOREIGN PATENT DOCUMENTS 63-38438 10/1988 Japan .
1291379 11/1989 Japan .

OTHER PUBLICATIONS

"Proposal of Acceleration of Examination for Patent Application" The Patent, vol. 42, No. 11, 1989.
"Machine Technique" vol. 38, No. 11, Oct., 1990.
"Proposal of 'Conceptional Views' Addition to Patent Application: Reduction to ½ to ⅓ of Mechanism Understanding" Nikkeimechanical Oct. 15, 1990.

*Primary Examiner*—Heather R. Herndon
*Assistant Examiner*—Cliff Nguyen Vo

[57] ABSTRACT

An apparatus and method for creating conceptional drawings for explaining the operation of a machine displays operation symbols corresponding to elements of the machine, selects predetermined symbols and arranges the selected symbols, connects the symbols with segments in a manner corresponding to the form of the machine, adds operation symbols for indicating the operation directions of the symbolized elements, and forms a conceptional view for explaining the operation of the machine. The apparatus may include a memory unit, an auxiliary memory unit, a display, a drawing formation unit and an input unit.

1 Claim, 24 Drawing Sheets

EFFECT OF CONCEPTIONAL VIEWS

MECHANISM CONCEPTUAL DRAWING FORMATION METOD AND APPARATUS

This application is a continuation of application Ser. No. 07/775,985 filed as PCT/JP91/00401, Mar. 27, 1991, abandoned.

TECHNICAL FIELD

The present invention relates to mechanism conceptional drawing formation method and apparatus, and more particularly to a mechanism conceptional drawing formation method capable of readily understanding an operation of a machine and an apparatus for readily forming a mechanism conceptional drawing with the aid of a computer in accordance with the mechanism conceptional drawing formation method.

BACKGROUND ART

Conventionally, as a tool for a drawing formation assistant means for a designer, in general, a CAD, a CAE, a CAM and the like are known. These tools have been used as a tool for helping a person in carrying out an exact and correct drawing formation of a machine such as a manufacture design drawing formation or a manufacture structure analysis drawing formation. However, recently, as one applied field of the CAD or the like, it is considered that an information processing system is used when a mechanism conceptional drawing for readily understanding an operation of a machine is formed from conventional drawings.

Conventionally, for the mechanism conceptional drawing formation method and apparatus for visually helping the understanding of a summarized operation of the mechanism of this kind, for example, as a means for exhibiting an operation of a machine, conventionally, trigonometric views, an exploded view, a perspective view, an operational view composed thereof aligned in operational order, and the like have been used for illustrating the structure and the shape of the machine, and mostly by using such views showing the exact form of the actual machine, the operation of the machine is explained.

However, the operation of the machine can not be readily understood by the explanation by using the the trigonometric views, the exploded view, the perspective view, the operational view and the like for showing the structure and the shape of the machine. In order to compensate for this problem, recently, for instance, a proposal for partly expressing mechanism drawings by using conceptional views as a conception approximate drawing method has been done. However, this proposal does not give details of a specific drawing method, and it is quite difficult to actually carry out the drawing formation by the method for expressing the mechanism drawings by using the conceptional views.

As described above, in the conventional drawing formation method, since the views drawn on the basis of the drawings illustrating the exact shape of the actual machine are used, the expression of the machine form is emphasized, and it is not enough to understand the operation of the machine. Also, the essence of the operation of the machine can not be explained well.

In order to overcome the aforementioned problem, the present invention is provided, and it is an object of the present invention to provide a mechanism conceptional drawing formation method capable of understanding an operation of a machine in a short time and a mechanism conceptional drawing formation apparatus capable of readily forming conceptional drawings with the aid of a computer in accordance with the mechanism conceptional drawing formation method.

DISCLOSURE OF INVENTION

In order to achieve the above-described object, there are provided a mechanism conceptional drawing formation method and a mechanism conceptional drawing formation apparatus realizing the mechanism conceptional drawing formation method according to the present invention.

In a first aspect the invention is a mechanism conceptional drawing formation method for converting a form drawing of a machine structure into a mechanism conceptional view in which composition elements are symbolized, comprising a recognition step for recognizing mechanism operations and power transmission paths from the form drawing; a separation step for separating the recognized mechanism operations into a plurality of blocks; a symbolization step for symbolizing the composition elements for making the separated mechanism operations to obtain mechanism element symbols; a step for connecting the mechanism element symbols with segments corresponding to the form of the machine to form a segment connection view; a perspective view formation step for drawing a perspective view from the segment connection view; and an operation symbol addition step for adding operation symbols indicating directions of the operations to the mechanism element symbols.

In a second aspect the invention is a mechanism conceptional drawing formation method for converting a form drawing of a machine structure into a mechanism conceptional view in which composition elements are symbolized, comprising a step for defining operation symbols constituting elements of mechanism operations and mechanism element symbols constituting bases of the operations; a step for selecting predetermined symbols from the mechanism element symbols and arranging the selected symbols corresponding to drawing information; a step for separating the arranged symbols into a plurality of classes in a mechanism having a complicated structure; a step for connecting the arranged symbols with segments corresponding to the form of the machine structure to form a segment connection view in one class; a step for expressing a connection relation of the separated classes in the mechanism having the complicated structure; a step for drawing a perspective view from the segment connection view; and a step for adding operation symbols indicating directions of the operations to the mechanism element symbols.

In a third aspect the invention is a mechanism conceptional drawing formation apparatus for forming a mechanism conceptional view in which composition elements of a machine structure are symbolized, the apparatus performing a drawing formation method which comprises a step for defining operation symbols constituting elements of mechanism operations and mechanism element symbols constituting bases of the operations; a step for selecting predetermined symbols from the mechanism element symbols; a step for drawing the selected symbols in predetermined positions; a step for connecting the drawn symbols with segments corresponding to the structure of a machine; and a step for adding operation symbols indicating directions of the operations to the mechanism element symbols.

Further, according to the invention, a mechanism conceptional drawing formation apparatus for forming a mechanism conceptional view for expressing an operation of a machine, comprises a display means for displaying operation symbols to become elements of mechanism operations and mechanism element symbols to become bases of operations on a display surface; a selection means for selecting predetermined symbols from the mechanism element symbols displayed by the display means; an arrangement means for arranging the selected symbols corresponding to the operation of the machine to be drawn; a connection means for connecting the arranged symbols with segments corresponding to the structure of the machine; and a means for adding operation symbols for indicating directions of the operations to the connected symbols and displaying the operation symbol added symbols, and further comprising an arithmetic unit composed of integrated circuits for realizing the above-described means; a memory unit composed of the integrated circuits; an auxiliary memory unit composed of magnetic recording and reproducing equipment; a display unit composed of a CRT; a drawing formation unit composed of a plotter; and an input unit composed of either coordinates position indication equipment or a keyboard.

Therefore, according to the mechanism conceptional drawing formation method and the mechanism conceptional drawing formation apparatus realizing the mechanism conceptional drawing formation method according to the present invention, conventional drawing data are converted into mechanism element symbols by a drawing conversion means, and by a drawing symbolizing means, the mechanism element symbols are then converted into a combination of predetermined symbols whose mechanism operations are symbolized (these are carried out by the arithmetic unit and the display unit).

Then, according to the mechanism conceptional drawing formation method, by a drawing formation means, a work for drawing the mechanism conceptional views expressed by the operation symbols can be carried out (this is carried out by the drawing formation unit and the input unit).

BEST MODE FOR CARRYING OUT THE INVENTION

Now, one embodiment of a mechanism conceptional drawing formation method and a mechanism conceptional drawing formation apparatus for realizing the mechanism conceptional drawing formation method will be described in detail with reference to the accompanying drawings.

Figure 1:
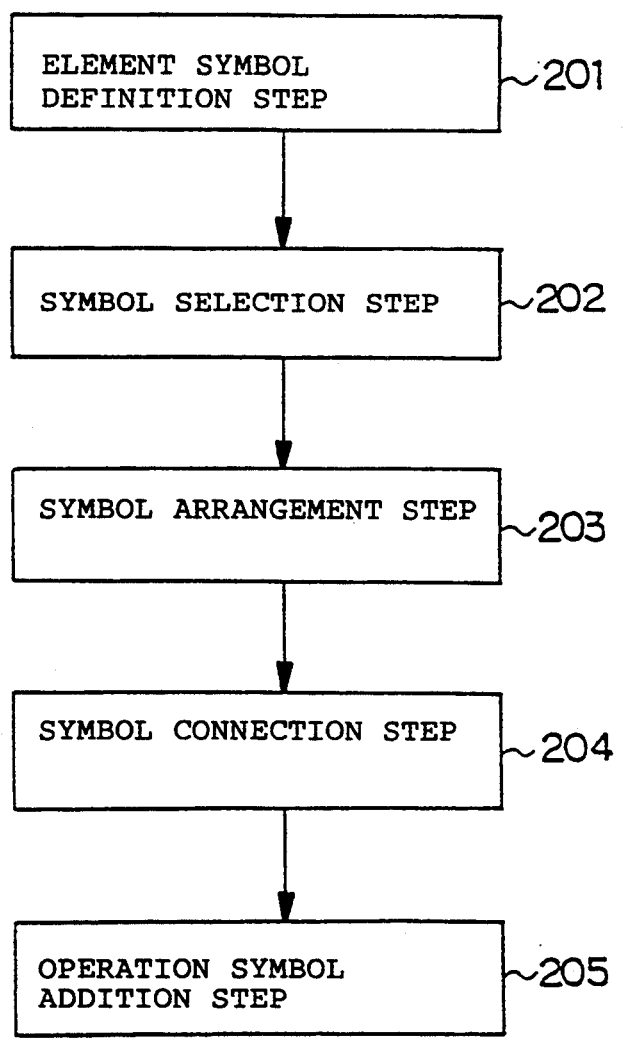
FIG. 1 schematically shows a mechanism conceptional drawing formation method according to the present invention.

FIG. 1 is a process view of a mechanism conceptional drawing formation method according to the present invention. In FIG. 1, the mechanism conceptional drawing formation method of the present invention is a drawing formation method which comprises a step 201 for defining operation symbols constituting elements of mechanism operations and mechanism element symbols constituting bases of the operations, a step 202 for selecting the desired symbols from the mechanism element symbols, a step 203 for drawing the selected symbols in the predetermined positions, a step 204 for connecting the drawn symbols with segments corresponding to the structure of a machine, and a step 205 for adding operation symbols indicating the directions of the operations to the mechanism element symbols.

Figure 2:
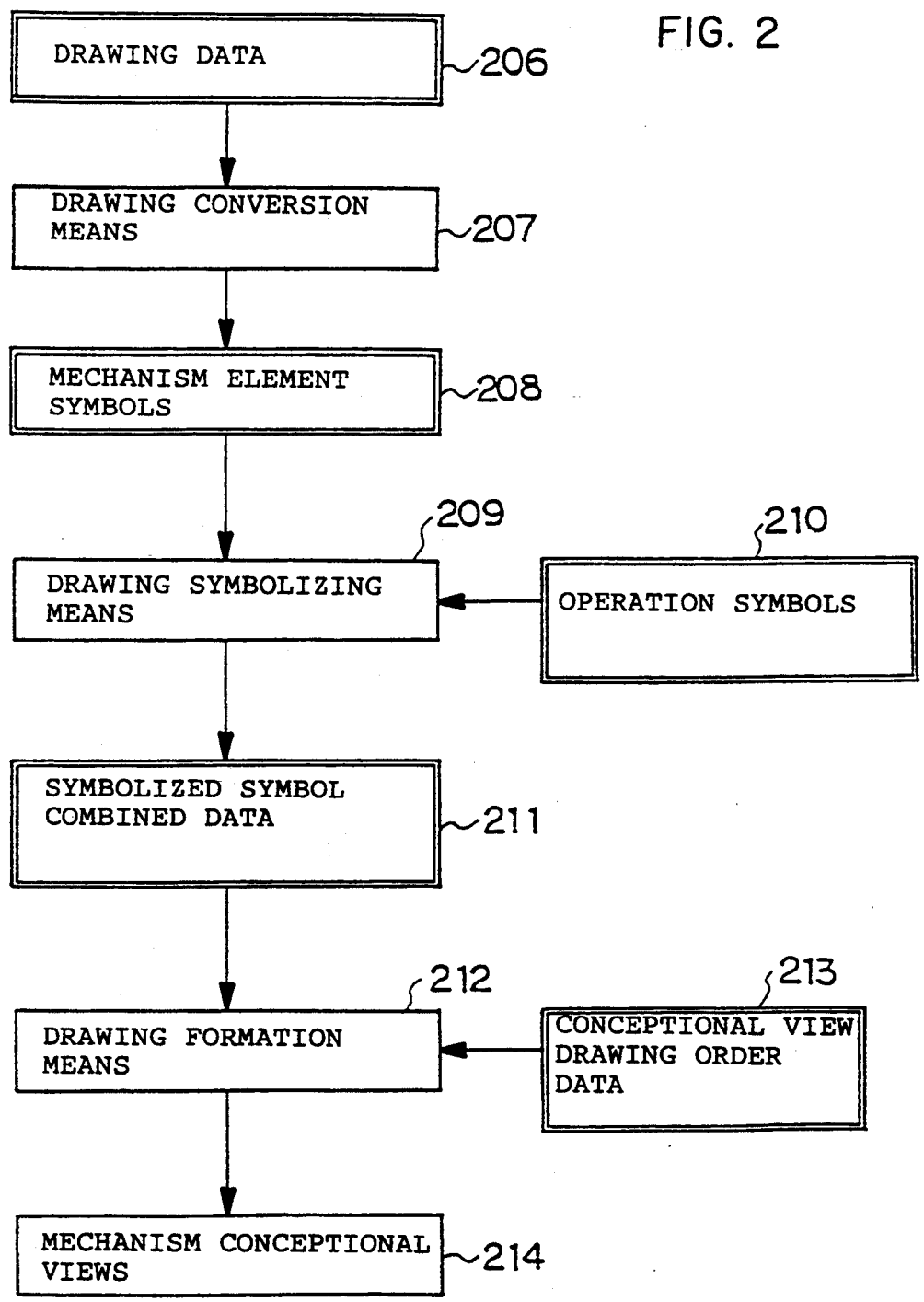
FIG. 2 shows one embodiment of the mechanism conceptional drawing formation method shown in FIG. 1 and is a view showing an operation order of a mechanism conceptional drawing formation apparatus for forming mechanism conceptional views capable of understanding an operation of a machine in a short time by using conventional drawing data.

FIG. 2 shows one embodiment of the mechanism conceptional drawing formation method shown in FIG. 1 and is a view showing an operation order of the mechanism conceptional drawing formation apparatus for forming mechanism conceptional views for assisting in an understanding of the operation of the machine expressed by drawings in a short time by using conventional CAD drawing data for drafting and drawing data for CAE mechanism analysis and structure analysis.

As shown in FIG. 2, in the mechanism conceptional drawing formation apparatus of the present invention, the conventional CAD drawing data 206 for the drafting and the drawing data 206 for the CAE mechanism analysis and structure analysis are converted into conversion data 208 such as mechanism element symbols to become premise for making up conceptional views by a drawing conversion means 207. Then, relating to the conversion data 208, a drawing symbolizing means 209 reads out symbolized operation symbols 210 previously defining the operation and the structure of the mechanism intended for the drawing data 206, and selects the optimum operation symbols in order to add them to the conversion data 208 to obtain symbolized symbol combined data 211.

The symbolized symbol combined data 211 formed by the drawing symbolizing means 209 are input to a drawing formation means 212, and the drawing formation means 212 refers to predetermined conceptional view drawing order data 213 and draws mechanism conceptional views 214 capable of understanding the operation of the machine in a short time.

The mechanism conceptional view formation order of the mechanism conceptional drawing formation apparatus according to the present invention will now be described in detail in connection with an information processing system as an actual realizing means.

That is, the conventional CAD drawing data 206 for the drafting and the drawing data 206 for the CAE mechanism analysis and structure analysis are stored in an auxiliary memory unit usually composed of a magnetic recording and reproducing equipment or the like, and the drawing conversion means 207 inputs the drawing data 206 and converts the drawing data 206 into the conversion data 208 to be the bases for forming the conceptional views.

On the other hand, in the mechanism conceptional drawing formation apparatus according to the present invention, the symbolized operation symbols 210 capable of readily expressing the operation of the mechanism and the structure of the machine are defined in advance, and they are stored in the auxiliary memory unit. The drawing symbolizing means 209 selects the desired symbols while referring to the stored symbolized operation symbols 210, and adds the symbolized operation symbols 210 to the conversion data 208 to form the symbolized symbol combined data 211.

The drawing formation means 212 not only inputs the symbolized symbol combined data 211 but also draws the target mechanism conceptional views 214 while referring to the conceptional view drawing order data 213 memorizing the rules and orders for drawing the conceptional views and the drawing formation methods.

Figure 5:
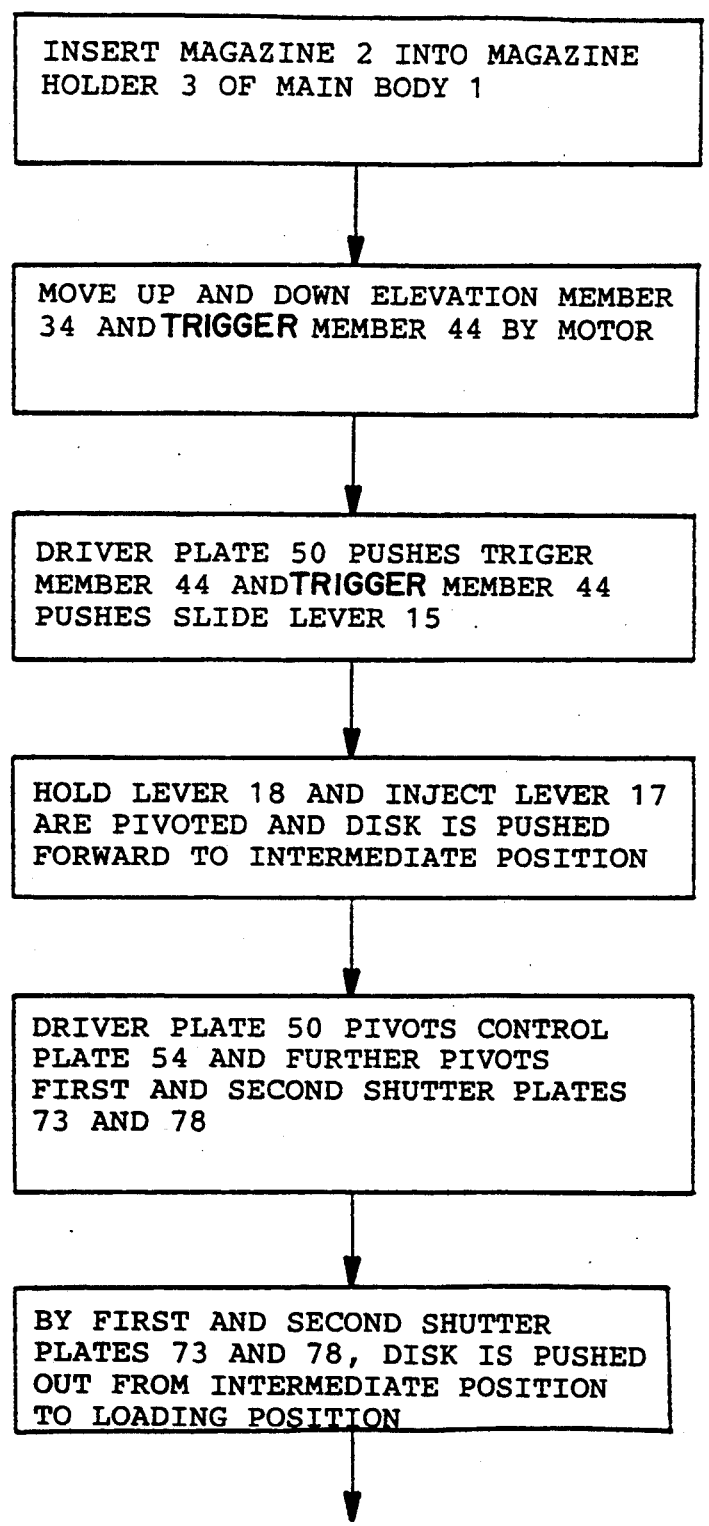
FIG. 5 is a flow chart showing a flow of a mechanism operation of a multidisk player in a mechanism conceptional view of the multidisk player, formed by the mechanism conceptional drawing formation method shown in FIG. 2.
Figure 6:
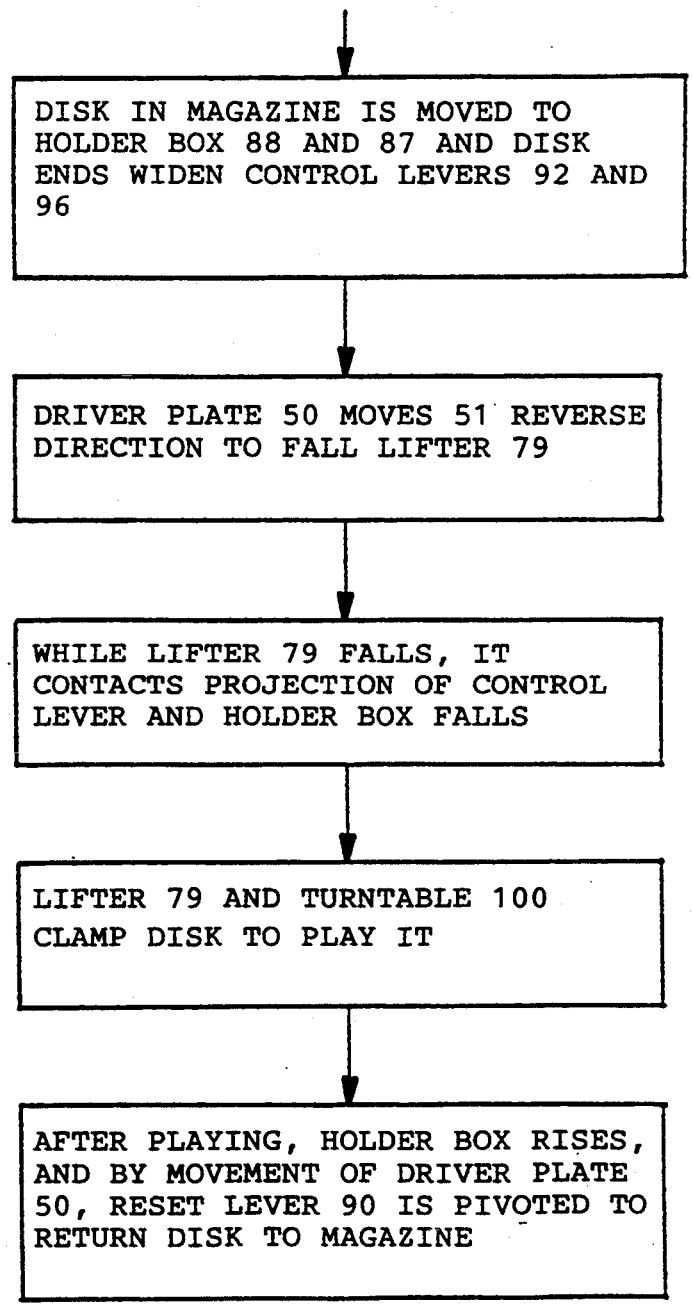
FIG. 6 is a continuation of the flow chart of FIG. 5 showing the flow of the operation of the multidisk player shown in FIGS. 7 to 17.
Figure 7:
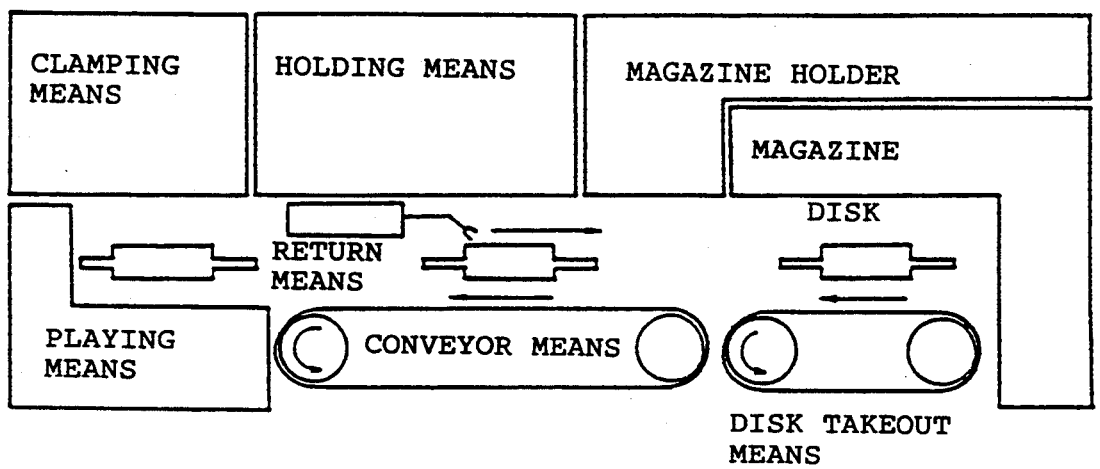
FIG. 7 is a schematic conceptional view showing a combination of the whole mechanism of the multidisk player shown in FIGS. 8 to 17.
Figure 8:
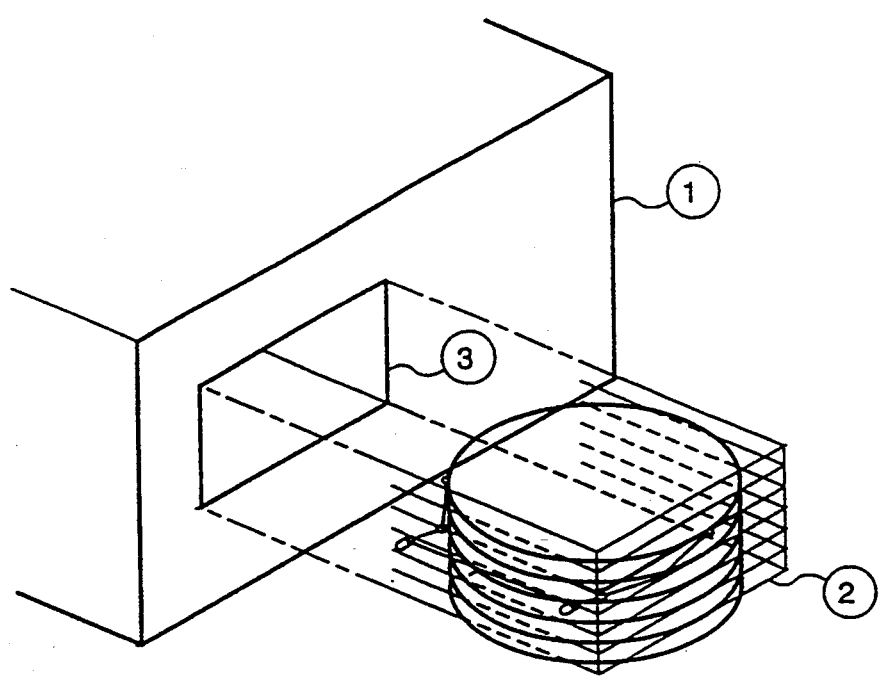
FIG. 8 is a mechanism conceptional view of the multidisk player whose mechanism is exploded into block units.
Figure 9:
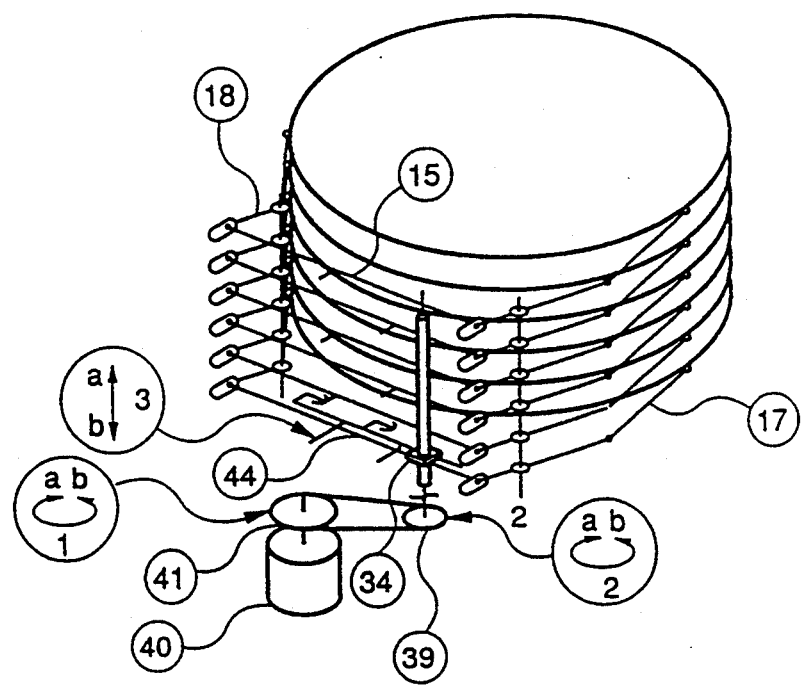
FIG. 9 is a mechanism conceptional view of the multidisk/player whose mechanism is exploded into the block units.
Figure 10:
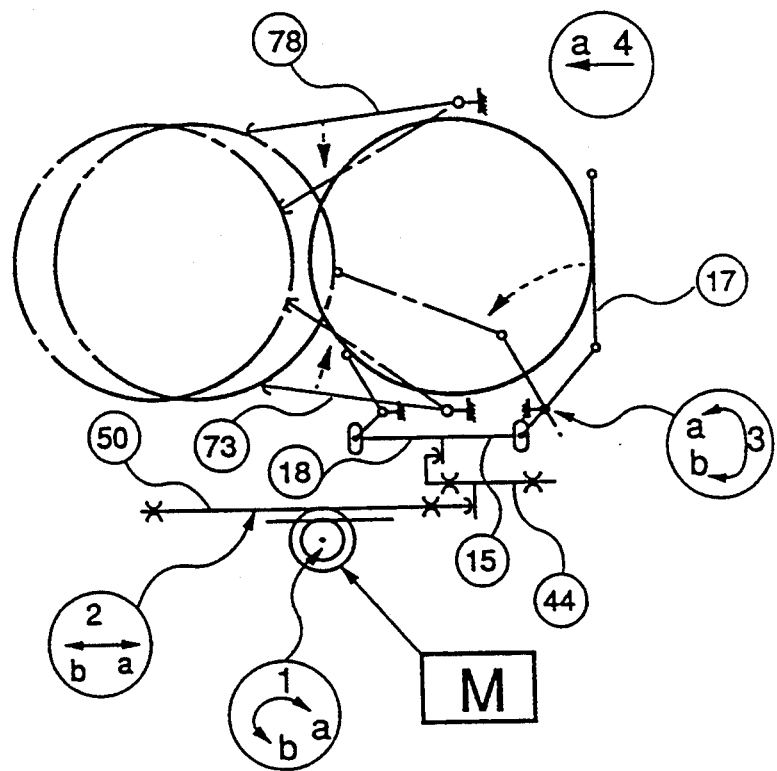
FIG. 10 is a mechanism conceptional view of the multidisk/player, whose mechanism is exploded into the block units.
Figure 11:
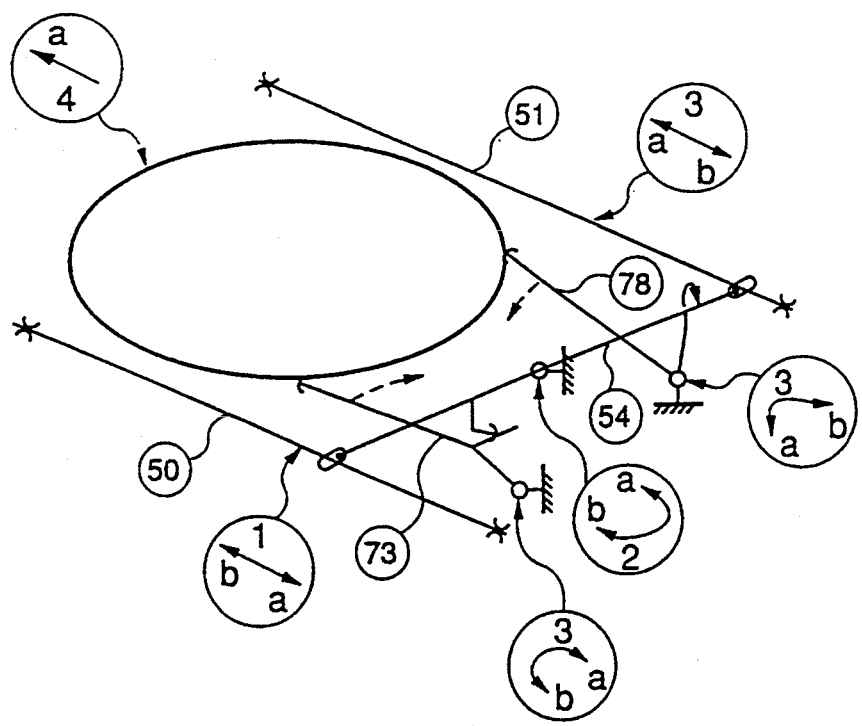
FIG. 11 is a mechanism conceptional view of the multidisk player whose mechanism is exploded into the block units.
Figure 12:
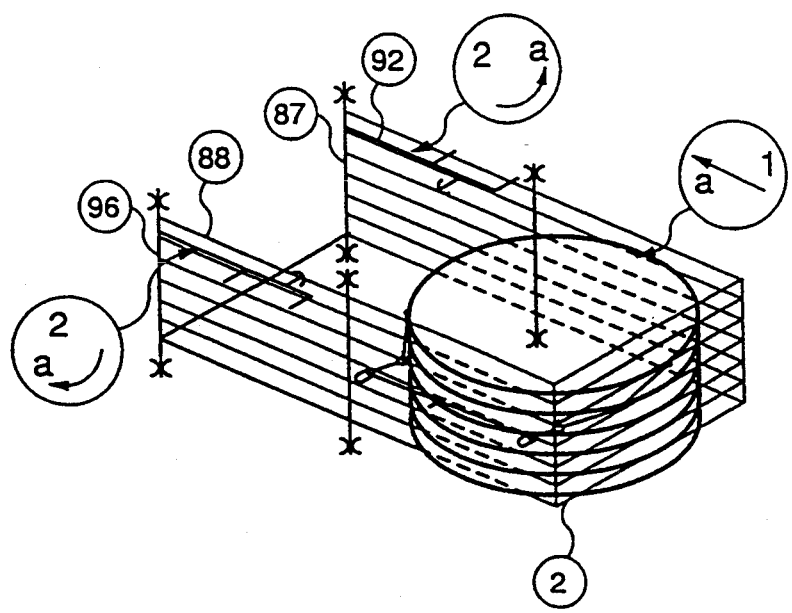
FIG. 12 is a mechanism conceptional view of the multidisk player whose mechanism is exploded into the block units.
Figure 13:
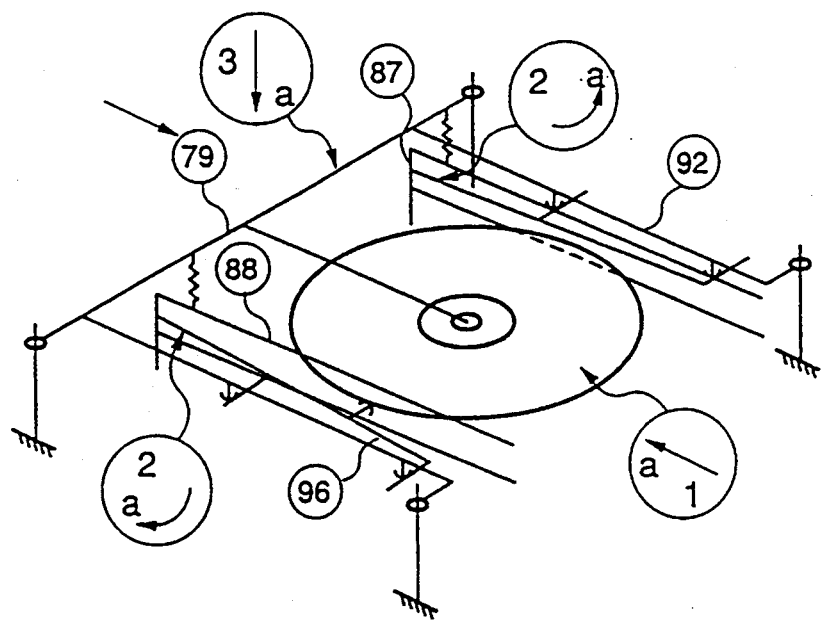
FIG. 13 is a mechanism conceptional view of the multidisk player whose mechanism is exploded into the block units.
Figure 14:
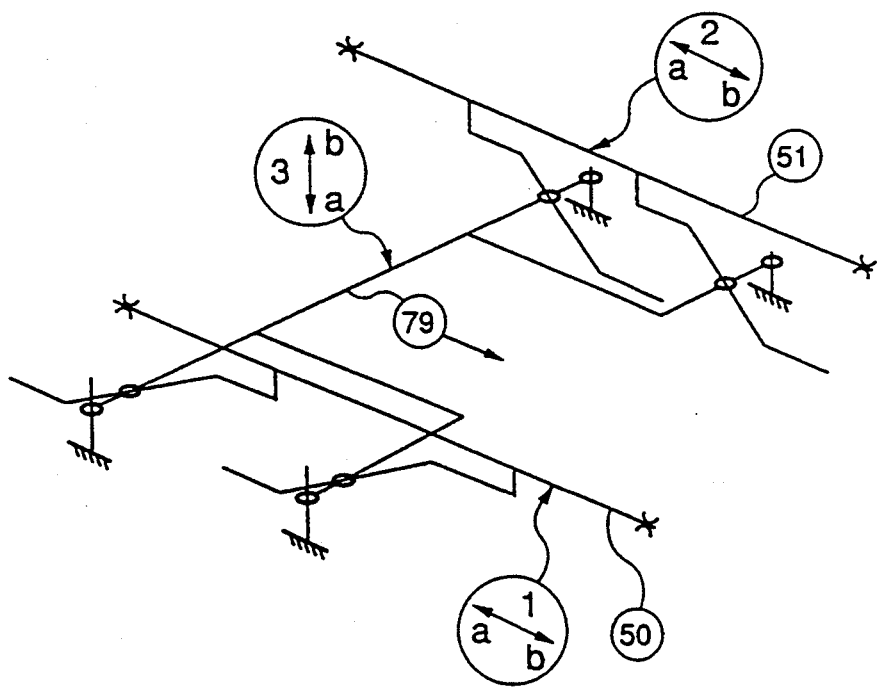
FIG. 14 is mechanism conceptional view of the multidisk player whose mechanism is exploded into the block units.
Figure 15:
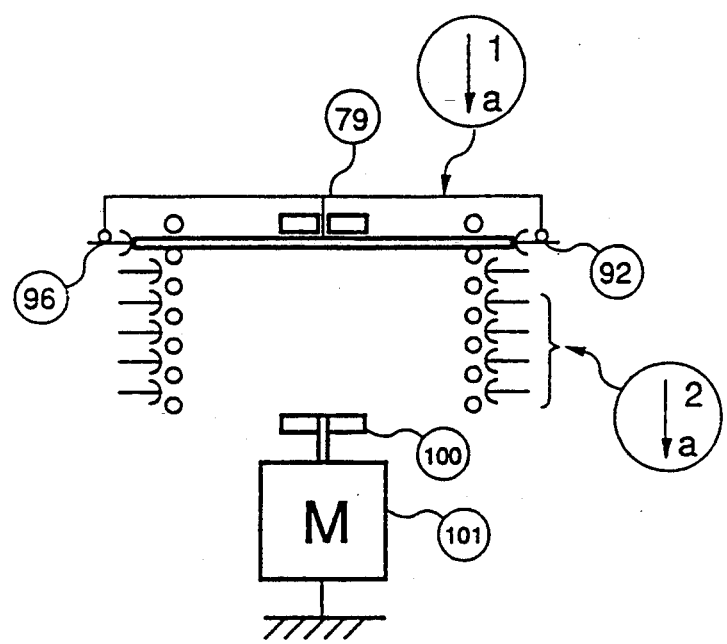
FIG. 15 is a mechanism conceptional view of the multidisk player whose mechanism is exploded into the block units.
Figure 16:
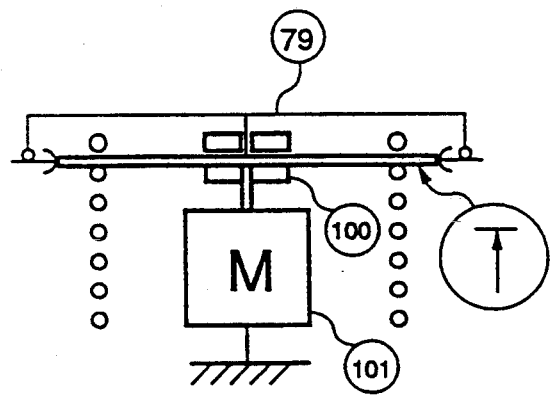
FIG. 16 is a mechanism conceptional view of the multidisk/player whose mechanism is exploded into the block units.
Figure 17:
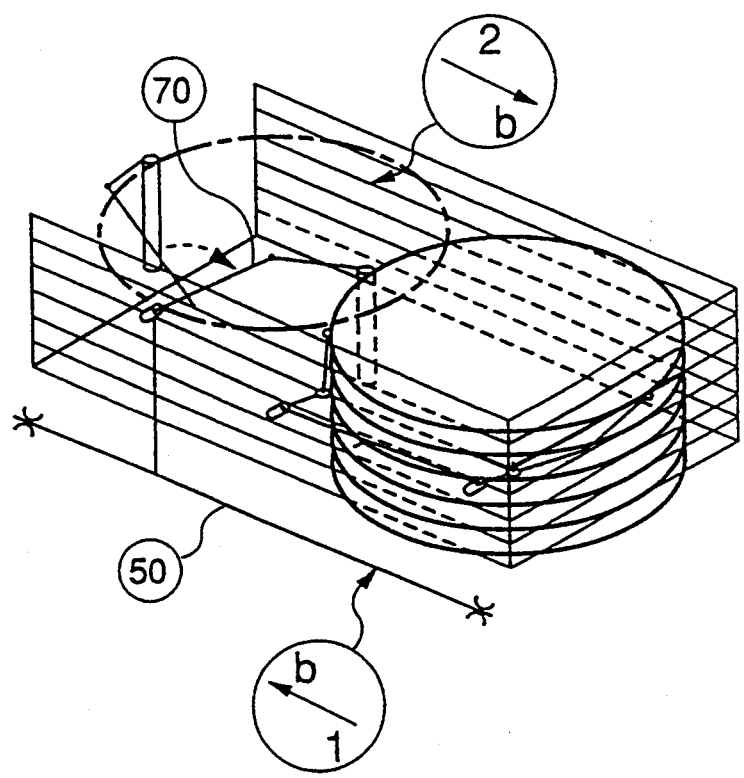
FIG. 17 is a mechanism conceptional view of the multidisk player whose mechanism is exploded into the block units.

FIGS. 5 to 17 are mechanism conceptional views showing an operation of mechanisms of a multidisk player, formed by the above-described mechanism conceptional drawing formation method. FIGS. 5 and 6 are flow charts illustrating a flow of the operation of the multidisk player. FIG. 7 is a schematic conceptional view showing a combination of the whole mechanism of the multidisk player. Further, FIGS. 8 to 17 are mechanism conceptional views of the multidisk player, in which the mechanism is exploded into block units. Although the detail of the contents of these views are not described in particular, the contents are clear from the above description and the views. Briefly, FIG. 8 illustrates the main body 1, magazine 2, and magazine holder 3 of the multidisk player. FIG. 9 illustrates a first slide lever 15, an inject lever 17, a holding lever 18, a pulley 39, a driving motor 40, a pulley 41, and a trigger member 44 of the multidisk player. FIG. 10 further illustrates a driving plate 50, a first shutter 73, and a second shutter 78 of the multidisk player. FIG. 11 further illustrates a driving plate 51, and a control plate 54 of the multidisk player. FIG. 12 illustrates the magazine 2, holding boxes 87 and 88, and control levers 92 and 96 of the multidisk player. FIG. 13 illustrates the holding boxes 87 and 88 and the control levers 92 and 96, in addition to a lifter 79 of the multidisk player. FIG. 14 illustrates the lifter 79 and driving plates 50 and 51 of the multidisk player. FIG. 15 illustrates the interaction of the lifter 79, the control levers 92 and 96, turntable 100, and driving motor 101 of the multidisk player. FIG. 16 illustrates the interaction of the lifter 79, the turntable 100, and the driving motor 101 of the multidisk player. FIG. 17 illustrates the driving plate 50 and reset lever 70 of the multidisk player.

Figure 3:
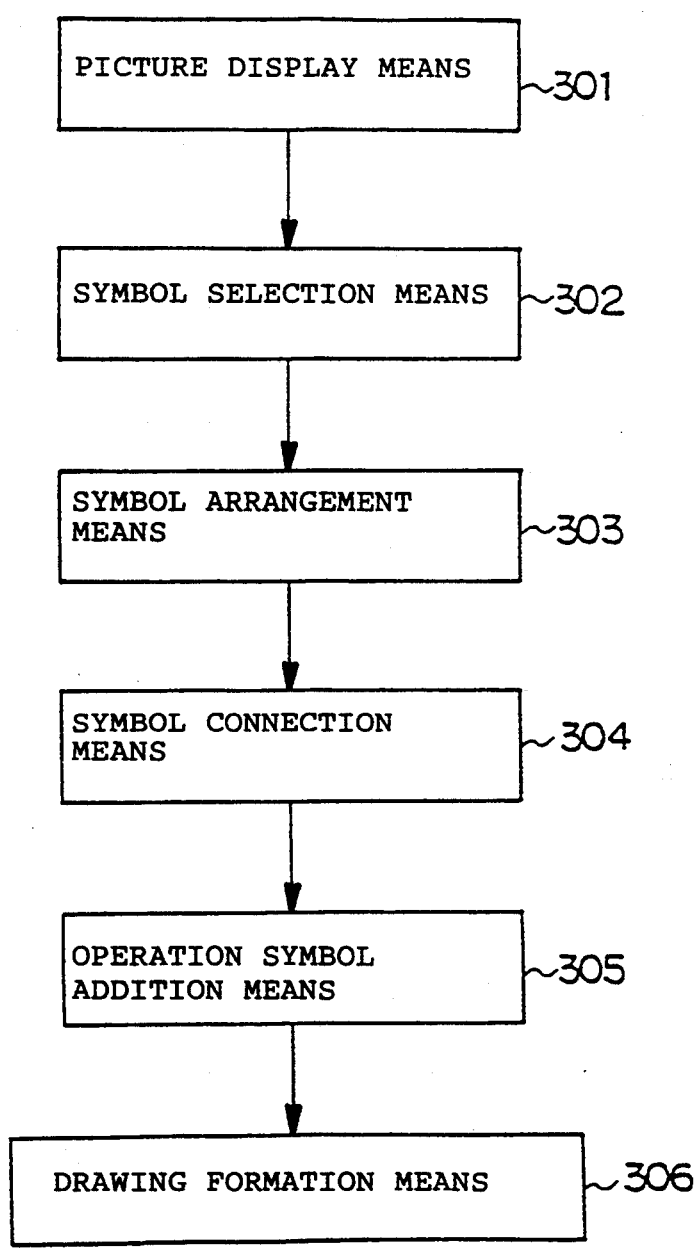
FIG. 3 schematically shows a function sequence of a second mechanism conceptional drawing formation apparatus according to the present invention.

Next, FIG. 3 is a view showing a sequence of functions of a construction of the second embodiment of the mechanism conceptional drawing formation apparatus realizing the mechanism conceptional drawing formation method shown in FIG. 1 according to the present invention.

In FIG. 3, the second mechanism conceptional drawing formation apparatus according to the present invention is an apparatus for carrying out the drawing formation of the mechanism conceptional views for expressing the operation of the machine, and comprises a picture display means 301 for displaying the operation symbols to become the elements of the mechanism operations and the mechanism element symbols to become the bases of the operations on its display surface, a symbol selection means 302 for selecting the desired symbols from the mechanism element symbols displayed by the picture display means 301, a symbol arrangement means 303 for arranging the selected symbols corresponding to the operation of the machine to be drawn, a symbol connection means 304 for connecting the arranged symbols with segments corresponding to the structure of the machine, an operation symbol addition means 305 for adding the operation symbols for indicating the directions of the operations to the mechanism element symbols, and a drawing formation means 306 for forming and showing the mechanism conceptional views added by the operation symbols.

Figure 4:
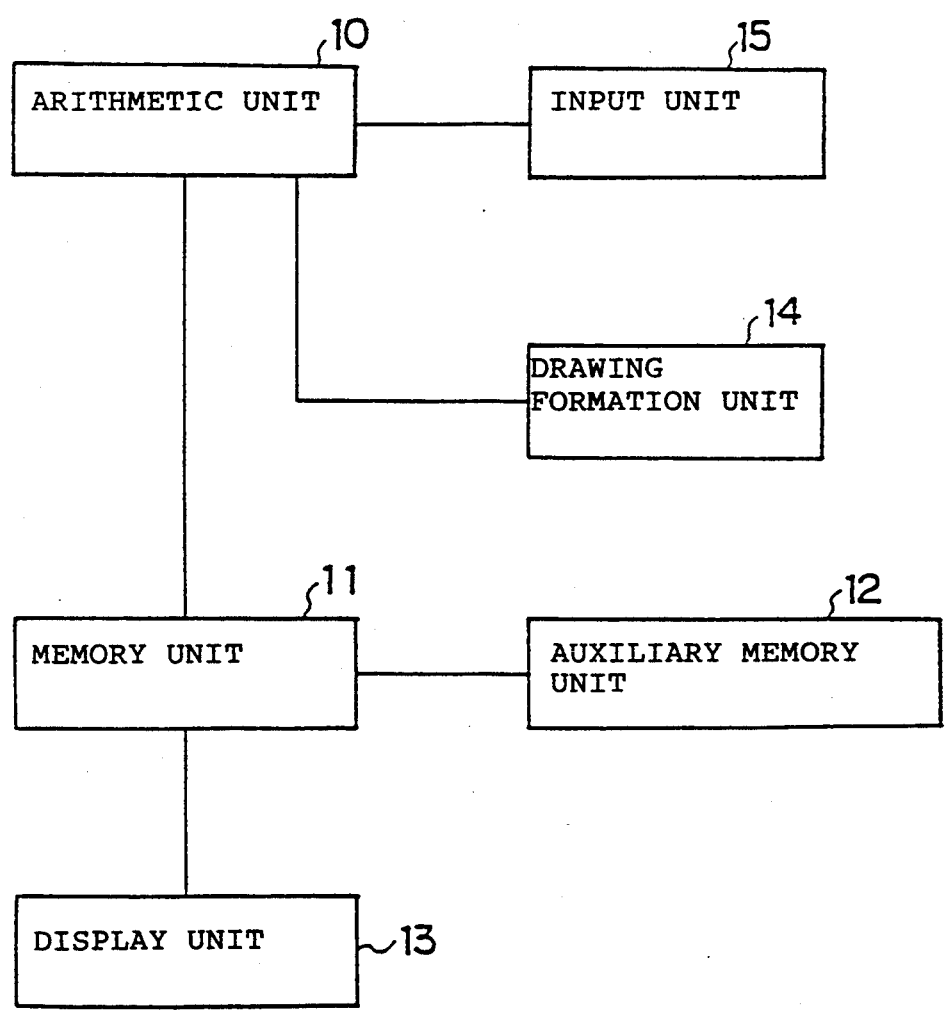
FIG. 4 is a block diagram of the second mechanism conceptional drawing formation apparatus according to the present invention.

FIG. 4 is a block diagram of one-embodiment of an information processing system for realizing the mechanism conceptional drawing formation apparatus having the function shown in FIG. 3.

In FIG. 4, the mechanism conceptional drawing formation apparatus for drawing the mechanism conceptional views for showing the operation of the machine according to the present invention comprises an arithmetic unit 10 composed of integrated circuits or the like, a memory unit 11 composed of integrated circuits or the like, an auxiliary memory unit 12 composed of magnetic recording and reproducing equipment or the like, a display unit 13 composed of a CRT or the like, a drawing formation unit 14 composed of a plotter or the like, and an input unit 15 composed of a coordinates position indication equipment or a keyboard.

The operation of the mechanism conceptional drawing formation apparatus described above will now be described in detail with reference to FIGS. 18 to 27.

First, as shown in FIGS. 3 and 4, in the mechanism conceptional drawing formation apparatus according to the present invention, by the picture display means 301, such as by the display unit 13 composed of the CRT or the like, displays the operation symbols to become the elements of the mechanism operations and the mechanism element symbols to become the bases of the operations on the display surface. More specifically, in the information processing system shown in FIG. 4, by the arithmetic unit 10 composed of the integrated circuits or the like, the memory unit 11 composed of the integrated circuits or the like and the auxiliary memory unit 12 composed of the magnetic recording and reproducing equipment or the like, the picture display means 301 is executed. That is, the arithmetic unit 10 reads out the mechanism element symbols stored in the auxiliary memory unit 12, and the display unit 13 displays them on the display surface.

Figure 18:
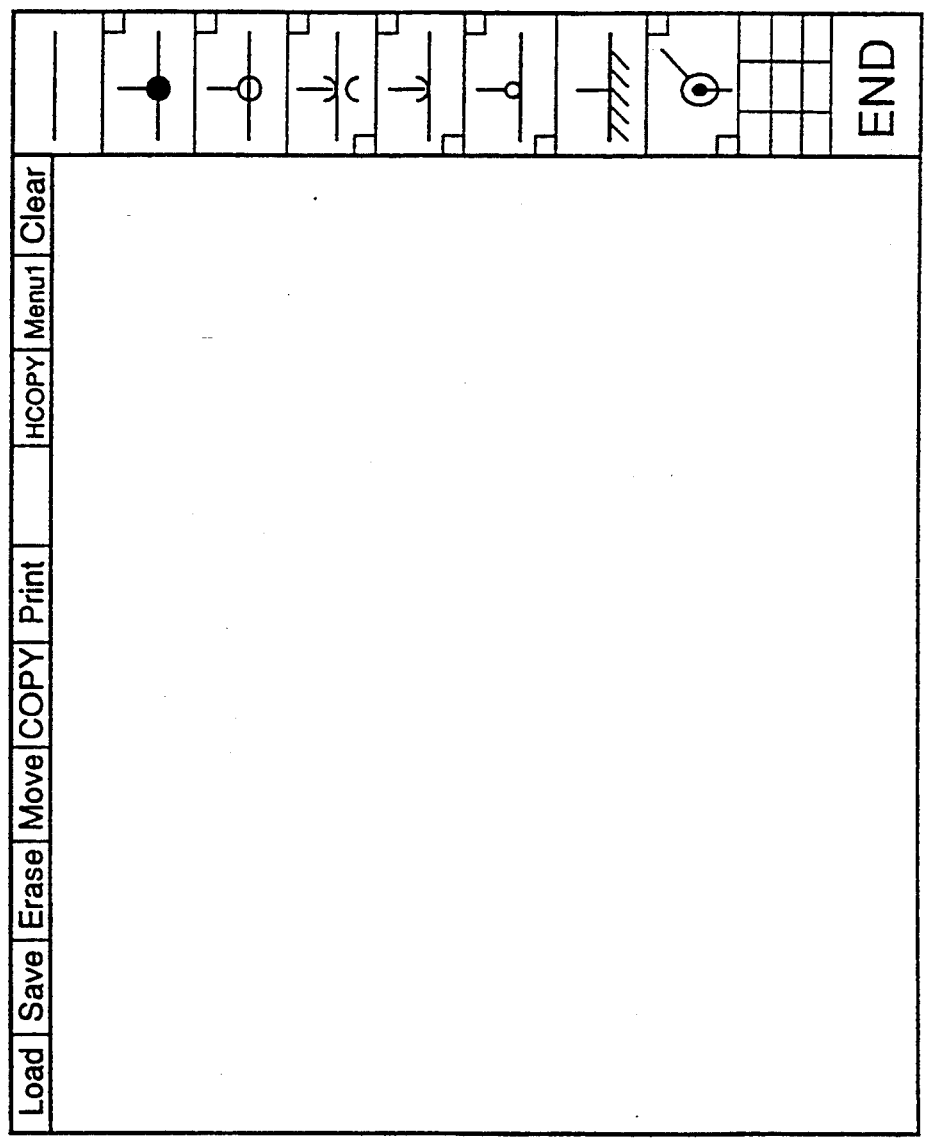
FIG. 18 is a view showing one example of mechanism element symbols shown by a picture display means 301 shown in FIG. 3 and a display unit 13 shown in FIG. 4.

FIG. 18 shows one example of the mechanism element symbols shown on the display unit 13 composed of the CRT or the like. In FIG. 18, there are shown the mechanism element symbols in the right hand side end of the CRT.

Then, the symbol selection means 302 selects the desired symbol from the mechanism element symbols displayed on the picture display means 301. More specifically, in the information processing system shown in FIG. 4, an operator selects the desired symbol from the mechanism element symbols displayed on the display unit 13 by using the input unit 15 composed of the coordinates position indication equipment or the keyboard.

Figure 19:
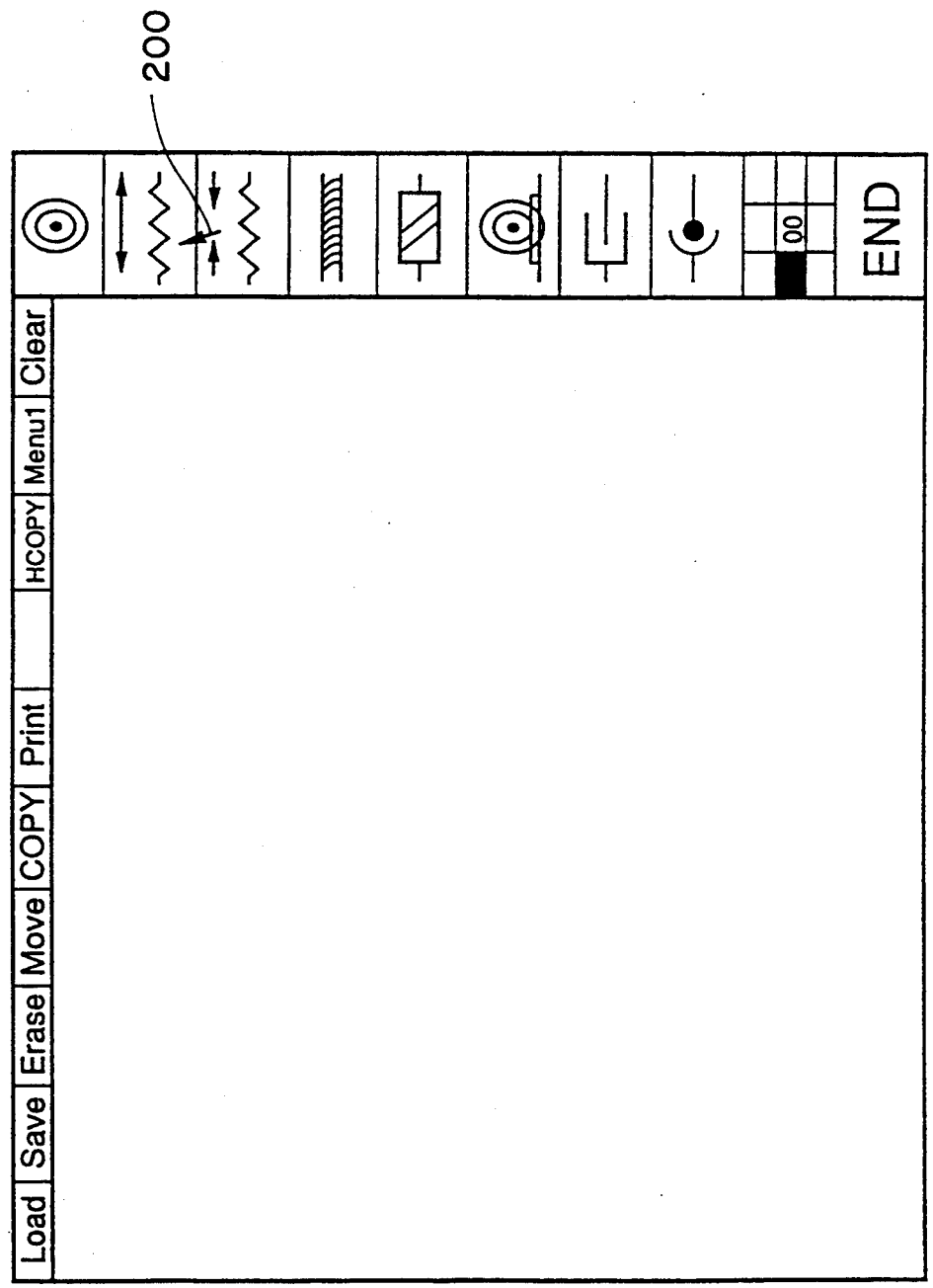
FIG. 19 is a view showing one example of a process in which a symbol selection is carried out by a symbol selection means 302 shown in FIG. 3.

FIG. 19 illustrates one example of the symbol selection process, and an arrow 200 in FIG. 19 indicates the mechanism element symbol to be selected by the operator.

Next, in the mechanism conceptional drawing formation apparatus according to the present invention, the symbol selected by the symbol selection means 302 is arranged so as to correspond to the operation of the machine to be expressed. More specifically, in the information processing system shown in FIG. 4, the arithmetic unit 10 reads the display symbol data which are selected by the symbol selection means 302 and correspond to the mechanism element symbols stored in the memory unit 11, out of the auxiliary memory unit 12, and the display unit 13 displays it thereon.

Figure 20:
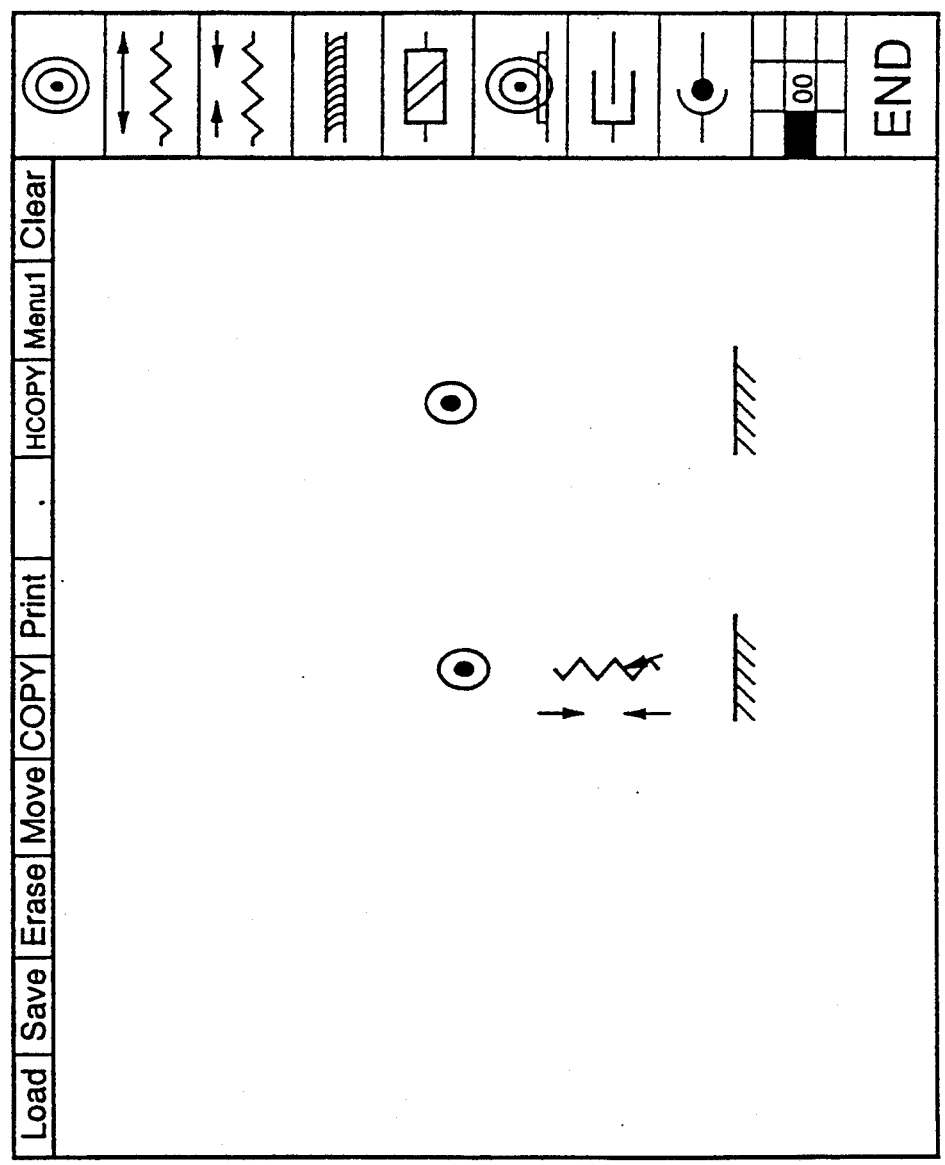
FIG. 20 is a view showing one example in which the symbols selected by the symbol selection means 302 are arranged by a symbol arrangement means 303 shown in FIG. 3.

The symbol arrangement means 303 is carried out as described above. FIG. 20 shows one example of the mechanism element symbols displayed on the display unit 13 by the symbol arrangement means 303 which arranges the selected symbols.

Then, the arranged symbols are connected with the segments by the symbol connection means 304 corresponding to the structure of the machine. More specifically, in the information processing system shown in FIG. 4, the arithmetic unit 10 asks the operator which of the arranged mechanism element symbols displayed on the display unit 13 are connected with the segments, and the operator instructs from the input unit 15 composed of the keyboard. In accordance with the instruction, the arithmetic unit 10 connects the symbols with the segments corresponding to the structure of the machine, and the auxiliary memory unit 12 stores its information. The arithmetic unit 10 read out the stored information from the auxiliary memory unit 12, and the display unit 13 displays the connected mechanism element symbols thereon.

Figure 21:
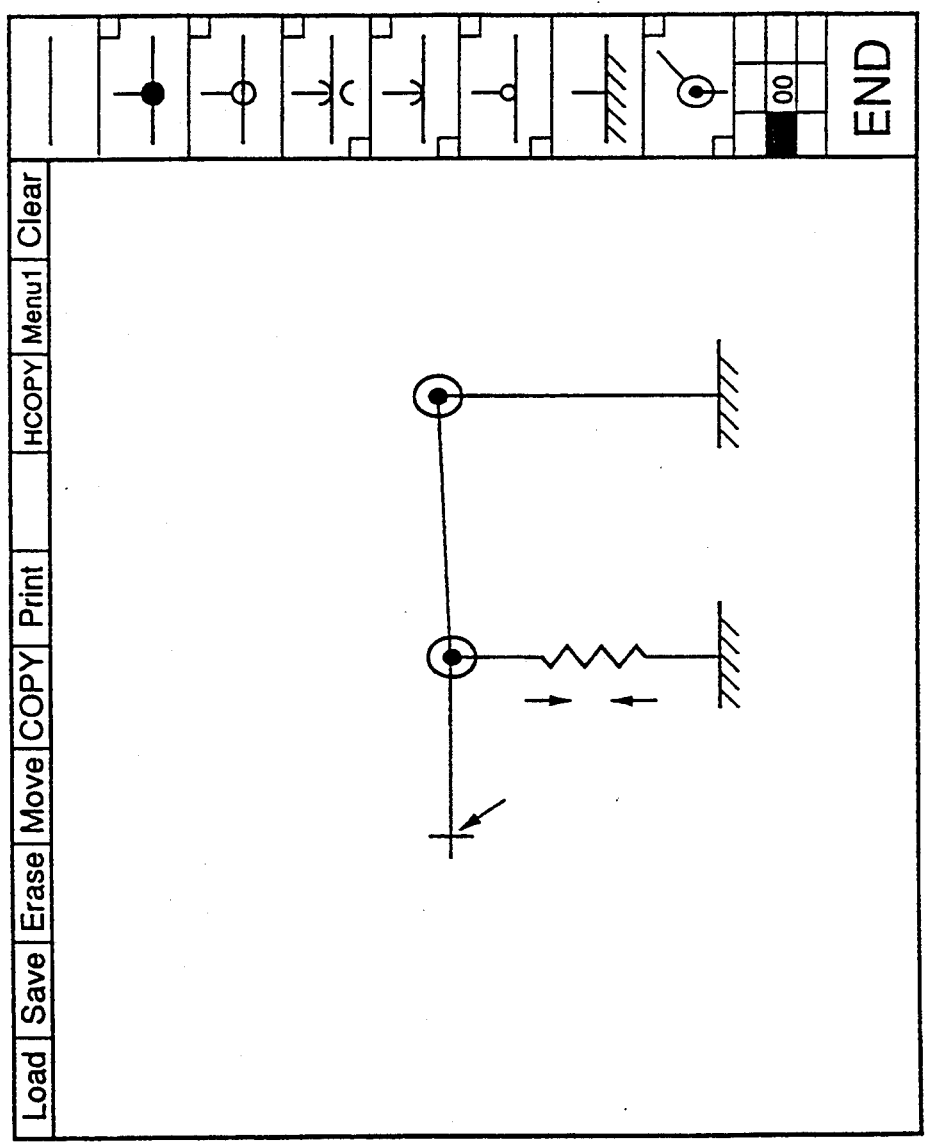
FIG. 21 is a view showing one example in which the arranged symbols are connected with segments by a symbol connection means 304 shown in FIG. 3.

FIG. 21 shows one example of the mechanism element symbols which are connected with the segments by the symbol connection means 304 and are displayed on the display unit 13.

Next, to the mechanism element symbols connected with the segments by the symbol connection means 304, the operation symbol addition means 305 adds the operation symbols indicating the operation directions, and the drawing formation means 306 displays the drawing provided with the operation symbols. That is, the operation symbols to be the elements of the mechanism operation are added to the connected mechanism element symbols by the operation symbol addition means 305. Hence, not only the operation directions of the mechanism element symbols are exactly shown but also the drawing of the mechanism element symbols formed with the operation symbols is displayed by the drawing formation means 306.

More specifically, in the information processing system shown in FIG. 4, for the connected mechanism element symbols displayed on the display unit 13, the arithmetic unit 10 reads the operation symbols corresponding to the mechanism element symbols out of the auxiliary memory unit 12 and adds them to the mechanism element symbols to display the mechanism element symbols provided with the operation symbols on the display unit 13.

Figure 22:
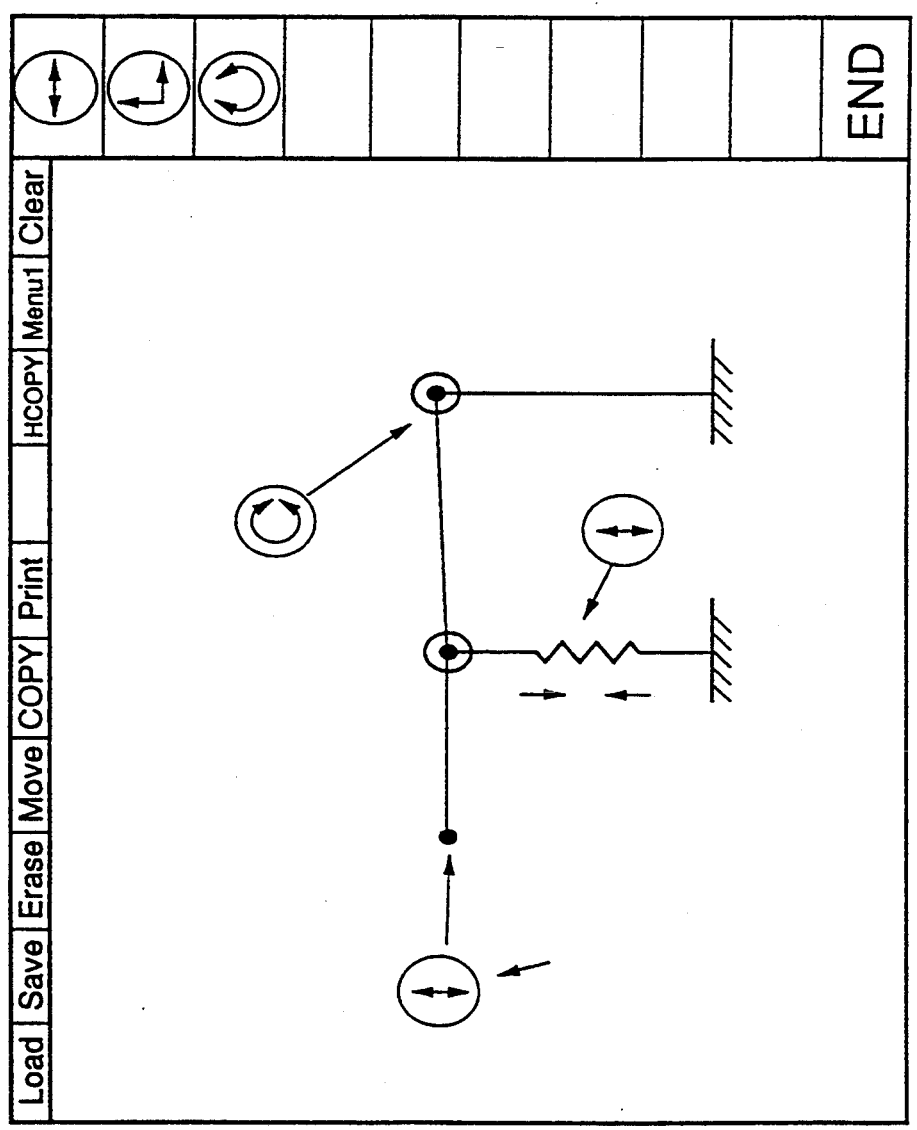
FIG. 22 is a view showing one example in which the mechanism element symbols are formed with operation symbols by an operation symbol addition means 305 shown in FIG. 3 and are displayed by a drawing formation means 306 shown in FIG. 3.

FIG. 22 shows one example of the mechanism element symbols which are formed with the operation symbols by the operation symbol addition means 305 and the drawing formation means 306 and are displayed on the display unit 13.

Figure 23:
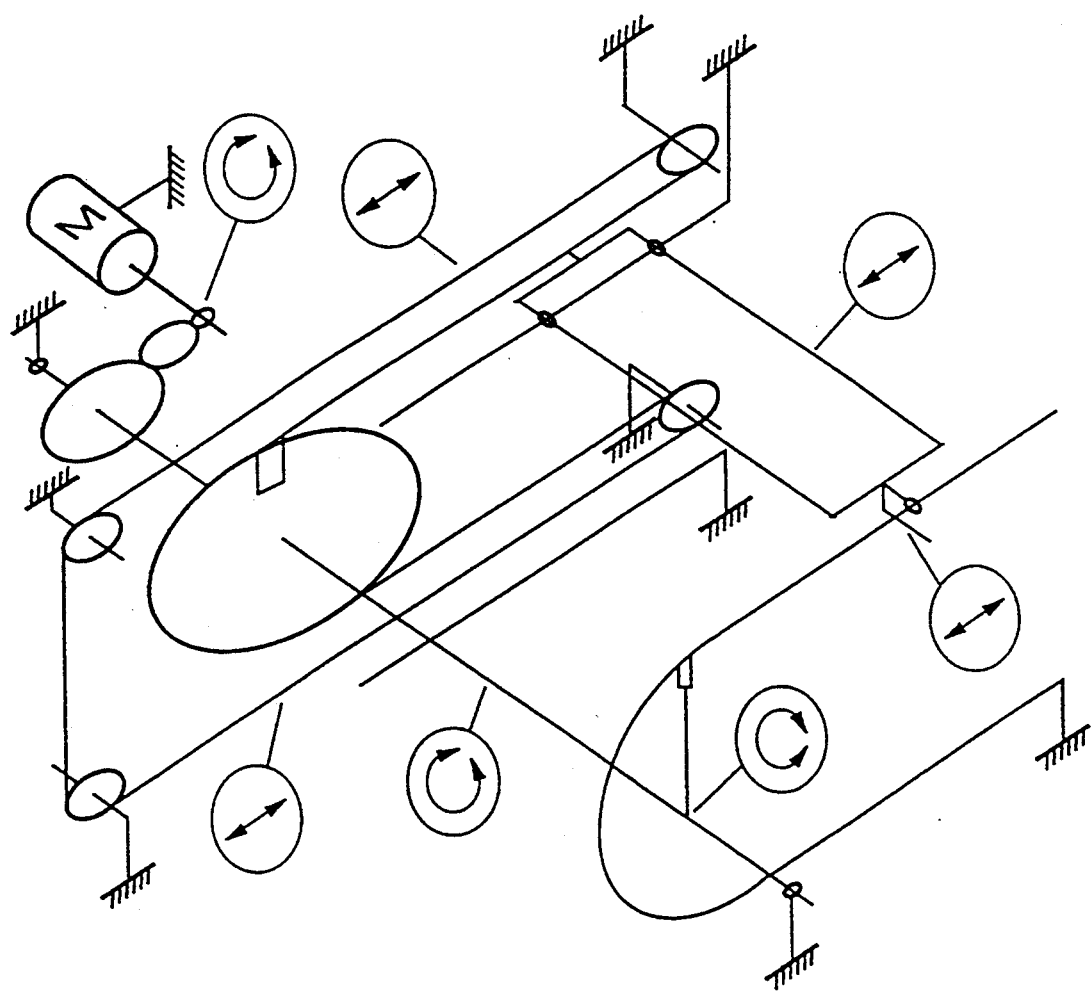
FIG. 23 is a mechanism conceptional view showing the operation of the mechanism of the multidisk player, formed by the mechanism conceptional drawing formation apparatus shown in FIGS. 3 and 4, and a mechanism conceptional view showing mechanism of a seeking operation of a disk pickup.
Figure 24:
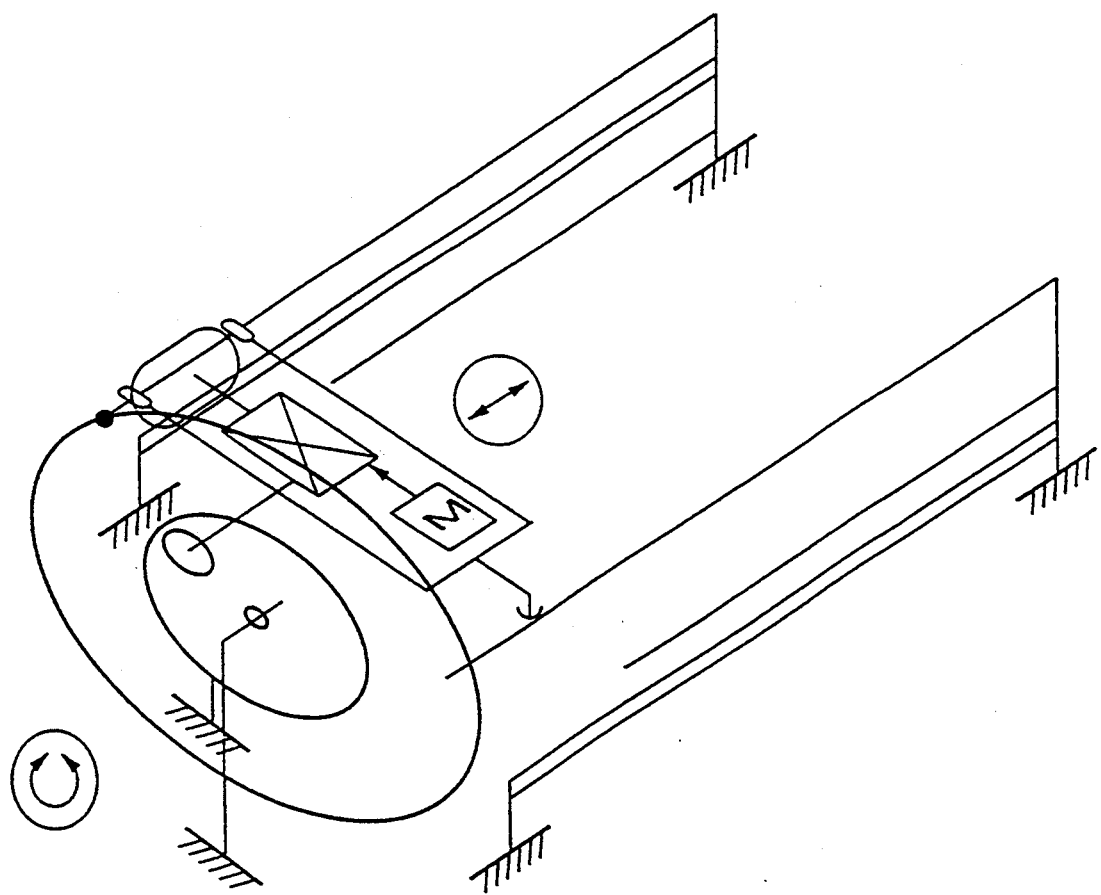
FIG. 24 is a mechanism conceptional view showing the operation of the mechanism of the multidisk player, formed by the mechanism conceptional drawing formation apparatus shown in FIGS. 3 and 4, and a mechanism conceptional view showing the mechanism of the seeking operation of the disk pickup.
Figure 25:
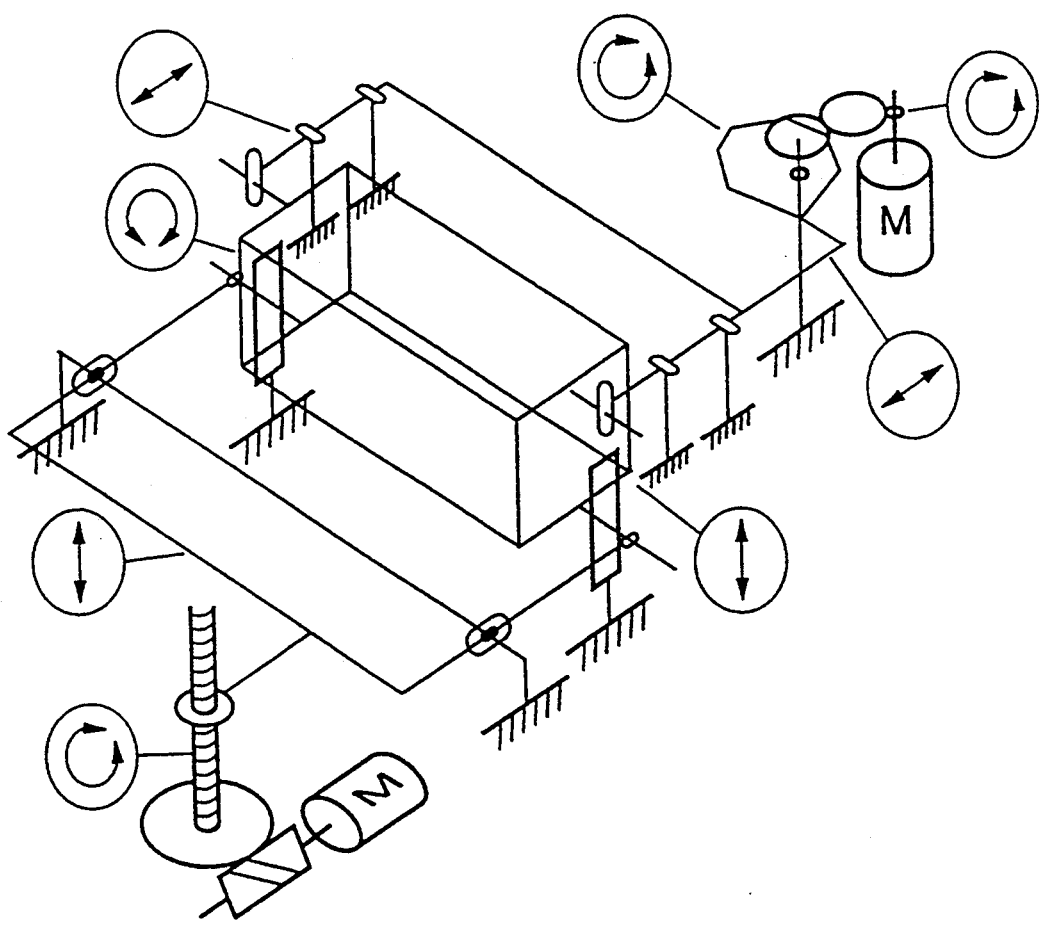
FIG. 25 is a mechanism conceptional view showing the operation of the mechanism of the multidisk player, formed by the mechanism conceptional drawing formation apparatus shown in FIGS. 3 and 4, and is a conceptional view showing mechanism of an adjustment of the disk pickup.
Figure 26:
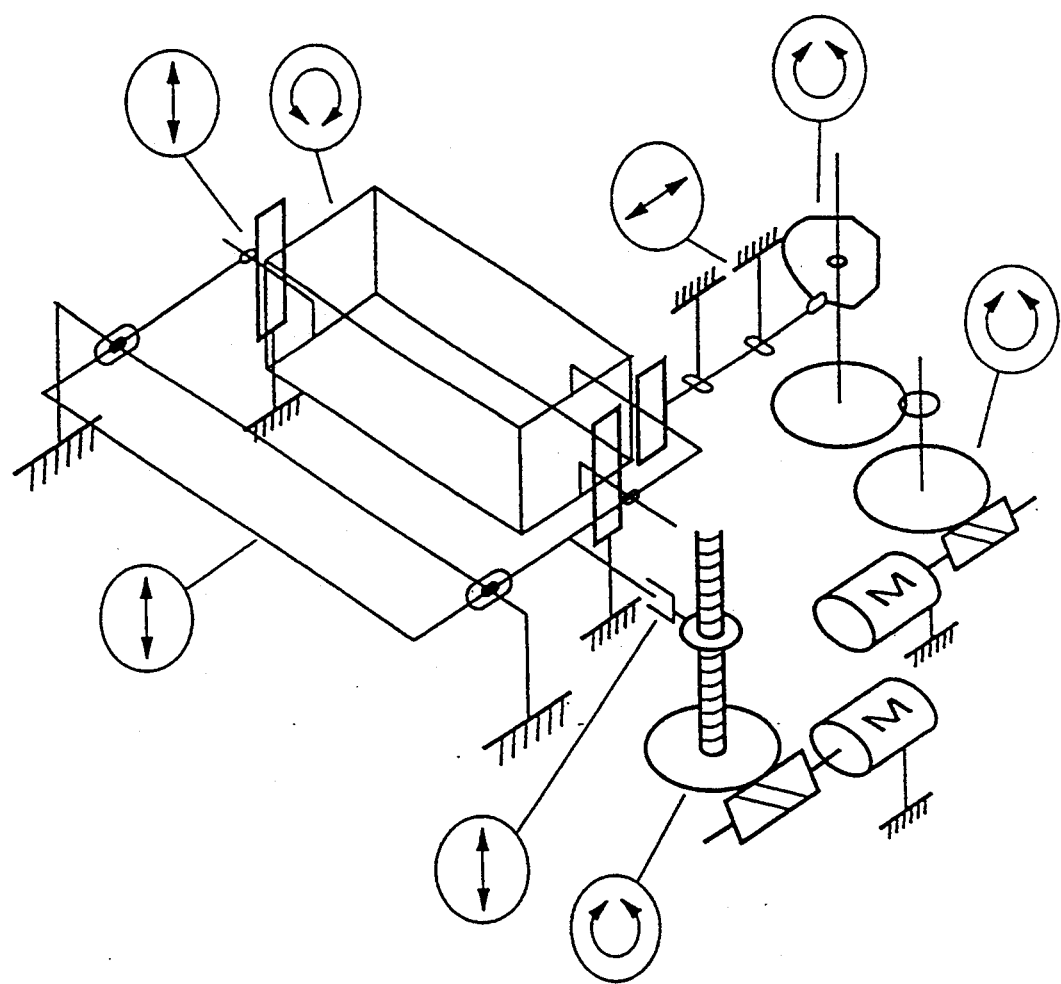
FIG. 26 is a mechanism conceptional view showing the operation of the mechanism of the multidisk player, formed by the mechanism conceptional drawing formation apparatus shown in FIGS. 3 and 4, and is a conceptional view showing the mechanism of the angle adjustment of the disk pickup.
Figure 27:
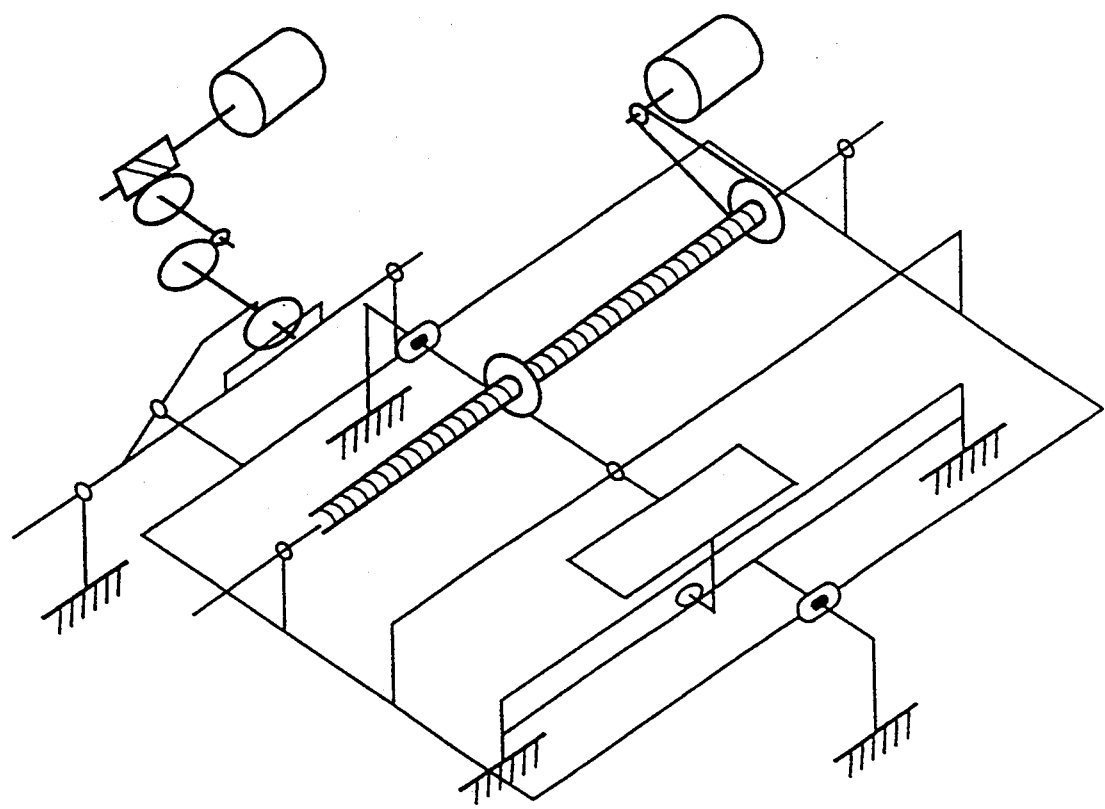
FIG. 27 is a mechanism conceptional view showing the operation of the mechanism of the multidisk player, formed by the mechanism conceptional drawing formation apparatus shown in FIGS. 3 and 4, and is a conceptional view showing the mechanism of the angle adjustment of the disk pickup.

Then, FIGS. 23 to 27 are mechanism of the conceptional views illustrating the operation of the mechanism the multidisk player, formed by the above-described second mechanism conceptional drawing formation apparatus according to the present invention. FIGS. 23 and 24 are mechanism conceptional views showing the mechanism of a seeking operation of a disk pickup FIG. 23 illustrates a dual track reproducing device for a video disk player which includes a front track reproducing with an optical pickup on a first rail and a rear track reproducing with the optical pickup on a second rail. When the optical pickup moves to the rear track from the front track, a hinge enters a receptacle of an arm and turns so that the optical pickup turns upside down and is now on the second rail. As illustrated in FIG. 24, when the optical pickup is moved to one end by a rack and pinion, which are rotated by a motor, a gear engages with the optical pickup and they turn together. Then, the optical pickup turns up side down and the pinion moves to the second rack from the first rack and to the second rail from the first rail. FIGS. 25 to 27 are conceptional views illustrating the mechanism of up and down movement and angle adjustment of the disk pickup.

FIGS. 25 to 27 illustrate the positioning mechanism for the optical pickup. As illustrated in FIG. 25, a first motor causes a cam to rotate to cause an arm to move. This causes the optical pickup to rotate around a bearing as a center to change a tilt angle. A second motor rotates a screw shaft to cause a nut to move up and down. This cause the arm to rotate thereby causing the optical pickup to move up and down. FIG. 26 is similar to FIG. 25 except FIG. 26 illustrates a different position of the screw shaft. As illustrated in FIG. 27, the first motor causes the screw shaft and a nut to move the optical pickup in a linear direction and the second motor causes the gear, pinion, rack, a grooved cam, and a seesaw to change the tilt angle.

Figure 28:
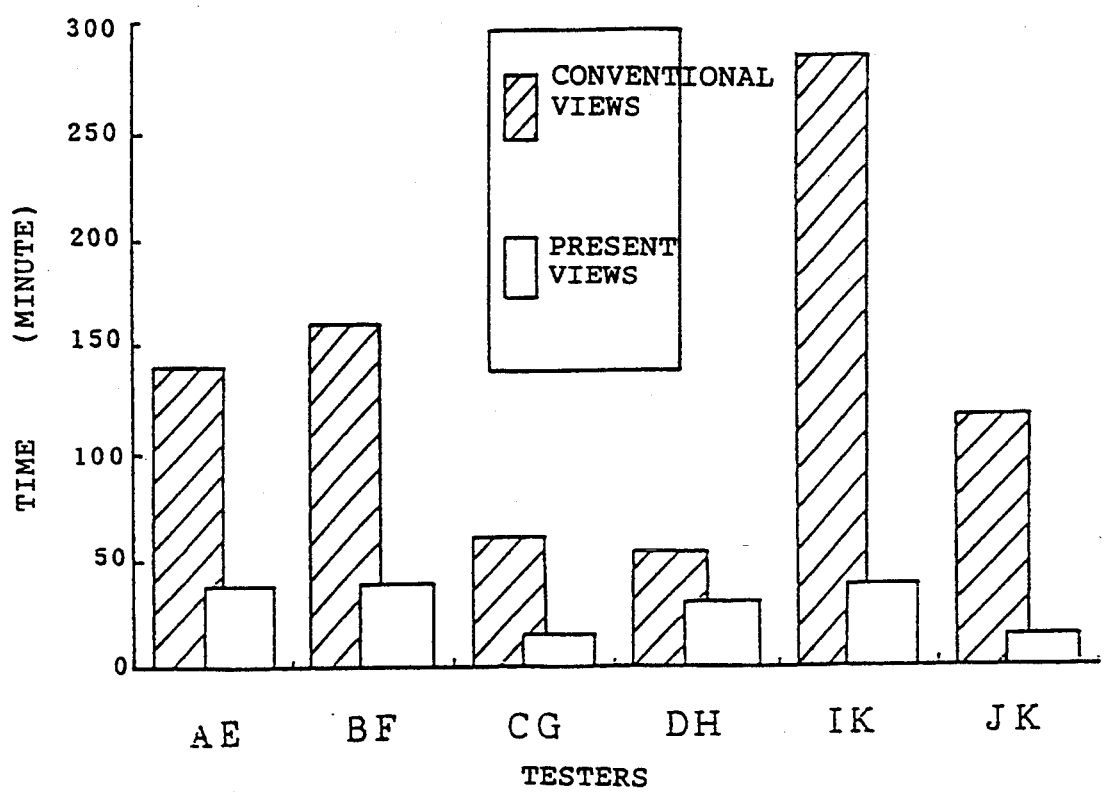
FIG. 28 is a graphical view showing required times until 12 test subjects are separately given mechanism conceptional views formed by a conventional drawing method and the mechanism conceptional views formed according to the present invention, can understand the operation of the machine by using such mechanism conceptional views.

FIG. 28 is a graphical view showing the result of the actual examination for the effectiveness of the mechanism conceptional views formed by the above-described mechanism conceptional drawing formation apparatus according to the present invention. That is, mechanism conceptional views formed by a conventional drawing method and the mechanism conceptional views formed according to the present invention were separately given to 12 testers, and the times required until the testers can understand the operation of the machine by using the two types of the mechanism conceptional views are shown in FIG. 28. From FIG. 28, it is readily understood that the required time for understanding the present mechanism conceptional views is approximately $\frac{1}{3}$ of that of the conventional mechanism conceptional views.

As described above, according to the mechanism conceptional drawing formation method and the mechanism conceptional drawing formation apparatus of the present invention, mechanism conceptional views capable of readily understanding an operation of mechanisms can be effectively obtained in a simple manner compared with a conventional drawing method using drawings such as trigonometric views, an exploded view, a perspective view, an operational view and the like for showing a structure and a shape of a machine.

Industrial Applicability

Therefore, in a field of a simplified CAD for use in works, for instance, a formation of a patent drawing and an improvement of already present machines, for which an exact and accurate drawing formation of the machines like a conventional CAD, CAE, CAM or the like as a drawing formation helping tool for a designer is not required, a mechanism conceptional drawing formation apparatus capable of readily understanding the operation of the mechanism in a simple operation as a powerful support tool for a designer can be effectively provided.

I claim:

1. A method for converting a form drawing of a machine structure into a mechanism conceptual view in which composition elements are symbolized for illustrating operation of the machine structure, comprising the steps of:

(a) symbolizing the composition elements of the machine structure;

(b) selecting predetermined symbols from the composition elements of the machine structure symbolized in said step (a);

(c) drawing the predetermined symbols selected in said step (b) in predetermined positions in accordance with drawing information;

(d) connecting the selected predetermined symbols drawn in said step (c) with segments corresponding to the form of the machine structure to form a segment connection view;

(e) separately defining operation symbols representing elements of mechanism operations and mechanism element symbols constituting bases of the mechanism operations;

(f) adding operation symbols indicating directions of operation near the predetermined symbols selected in said step (b) or the segments of said step (d) so as to indicate the directions of operation; and (g) numbering the operation symbols in accordance with an operational sequence of predetermined symbols selected in said step (b).

* * * * *